United States Patent [19]
Baker et al.

[11] Patent Number: 5,464,168
[45] Date of Patent: Nov. 7, 1995

[54] APPARATUS FOR SLITTING BELT

[75] Inventors: Ernest Baker, Renton; Charles W. Harris, Normandy Park, both of Wash.

[73] Assignee: Spencer Industries, Inc., Seattle, Wash.

[21] Appl. No.: 196,034

[22] Filed: Feb. 10, 1994

[51] Int. Cl.[6] .................................................. B65H 13/10
[52] U.S. Cl. .................. 242/530.1; 242/545; 242/534.1; 242/598.4; 464/102
[58] Field of Search ............................ 242/530.1, 530.4, 242/534.1, 545, 598.3, 598.4; 464/102, 104, 119, 106, 147

[56] References Cited

U.S. PATENT DOCUMENTS

| | | | |
|---|---|---|---|
| 19,887 | 4/1858 | Wilmarth et al. | 464/104 |
| 1,109,006 | 9/1914 | Neal . | |
| 1,128,432 | 2/1915 | Fetzer . | |
| 1,243,347 | 10/1917 | Schwinn . | |
| 1,528,433 | 3/1925 | Kay | 464/102 |
| 1,611,608 | 12/1926 | Psilander . | |
| 2,348,135 | 5/1944 | Jacobi | 70/379 |
| 2,698,359 | 12/1954 | Roberts | 242/530.4 |
| 2,735,684 | 2/1956 | Longee et al. | 279/1 |
| 3,098,365 | 7/1963 | Pearson . | |
| 3,406,924 | 10/1968 | Bruns et al. | 242/530.1 |
| 3,410,111 | 11/1968 | Ireland . | |
| 3,512,375 | 5/1970 | Madarasz et al. . | |
| 3,521,463 | 7/1970 | Heidrich . | |
| 3,685,756 | 8/1972 | Marx et al. | 242/56.2 |
| 4,015,791 | 4/1977 | Price | 242/56.2 |
| 4,191,318 | 3/1980 | Rogers | 225/103 |
| 4,201,352 | 5/1980 | Madachy | 242/530.1 |
| 4,238,082 | 12/1980 | Lund | 242/56.2 |
| 4,342,432 | 8/1982 | Lund et al. | 242/56.2 |
| 4,464,141 | 8/1984 | Brown | 464/75 |
| 4,565,541 | 1/1986 | Obrecht | 464/106 |
| 4,767,073 | 8/1988 | Malzacher | 242/598.3 |
| 4,824,418 | 4/1989 | Taubert | 464/159 |
| 4,840,601 | 6/1989 | Denman | 464/157 |
| 4,951,891 | 8/1990 | Kozbur et al. | 242/530.1 |
| 4,960,234 | 10/1990 | Focke | 242/543.1 |
| 5,248,027 | 9/1993 | Kluger et al. | 242/543.1 |

*Primary Examiner*—Daniel P. Stodola
*Assistant Examiner*—William A. Rivera
*Attorney, Agent, or Firm*—David P. Campbell

[57] ABSTRACT

A belt-slitting machine (10) comprising a frame (12), a work table (16), a first carriage (18) for supporting a supply roll (30) of belt material (51) and a second carriage (20) for supporting takeup rolls (32) of slit belt material (54). Motors/gearboxes (40, 42) turn spindles (28) in order to unwind the supply roll (30) of belt material and to roll up the slit webs of belt material into rolls (32). Coupler assemblies (102,104) are provided between cylinders (40, 42) and spindles (28). Coupler assemblies (102, 104) provide positive torque between cylinders (40, 42) and spindles (28) as spindles (28) deflect due to the weight of the belt material and cause the ends of the spindle to angularly deflect about the rotation axis of the spindle and to rise vertically a small distance due to the deflection. An outfeed belt divider apparatus (108, 112, 114) is provided for keeping the slit rolls of belt material separated as the belt material winds around into rolls (32). An edge position control device is provided for sensing the edge of the belt material. Carriages (18, 20) are repositionable laterally in response to the detected position of an edge of the belt material in order to keep the belt material aligned with cutter disks (68). In addition, tension rollers (44) and pinch rollers (60, 78) are provided in addition to drive rollers (62, 80) to control the movement of the belt material past the cutter disks (68).

12 Claims, 11 Drawing Sheets

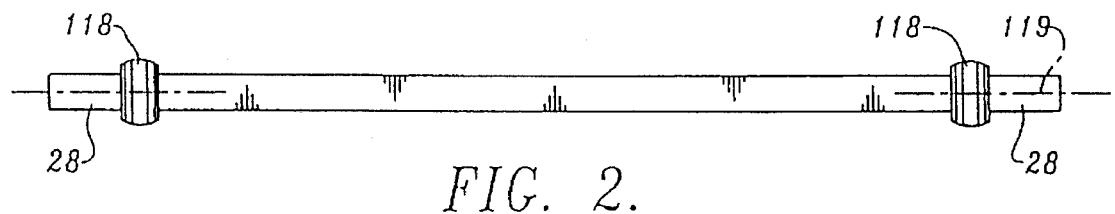
FIG. 2.
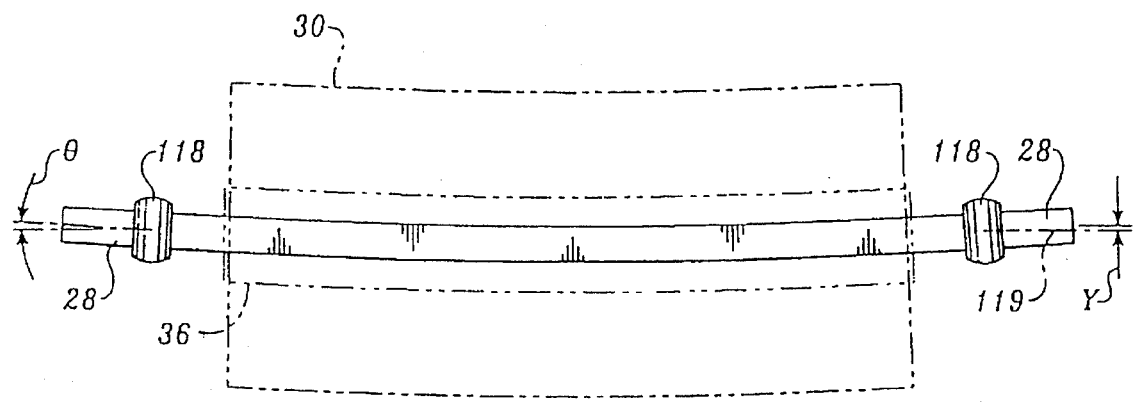
FIG. 3.
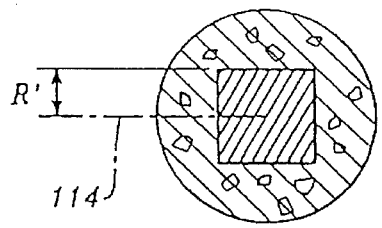 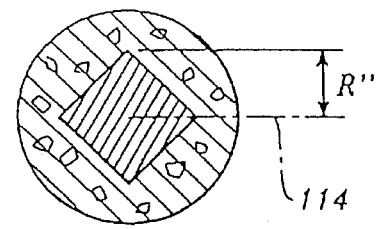
FIG. 4.     FIG. 5.

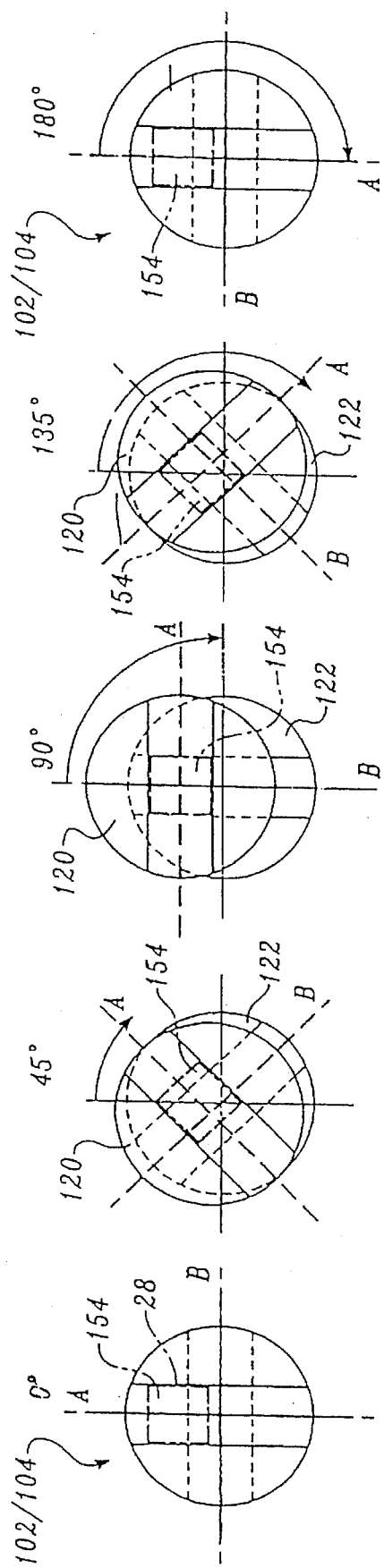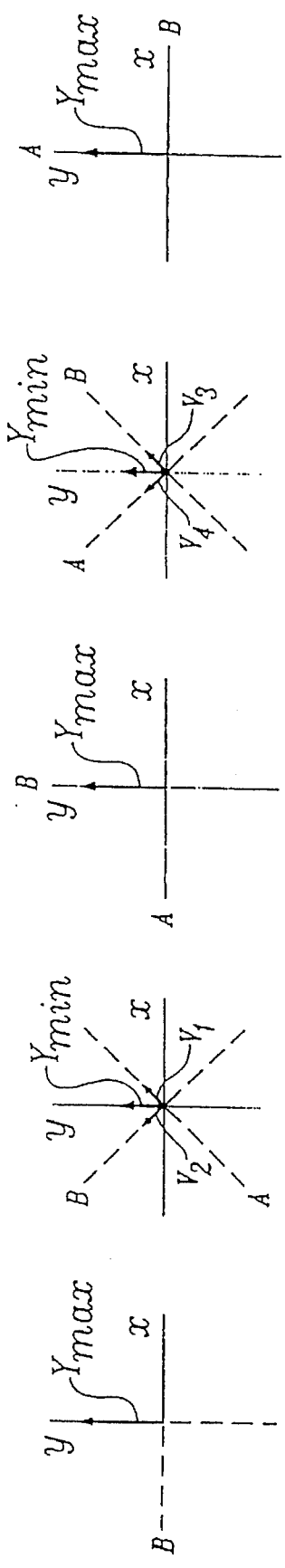
FIG. 7A. FIG. 7B. FIG. 7C. FIG. 7D. FIG. 7E. FIG. 7F. FIG. 7G. FIG. 7H. FIG. 7I. FIG. 7J.

APPARATUS FOR SLITTING BELT

TECHNICAL FIELD

This invention relates to an apparatus for handling belts, such as conveyor belts, and more particularly, to an apparatus for longitudinally slitting belt material to produce multiple, narrower-width belts.

BACKGROUND OF THE INVENTION

The present invention represents an improvement over the apparatus disclosed in U.S. Pat. No. 3,685,756, of Marx et al., titled "Method and Apparatus for Slitting Belt," issued Aug. 22, 1972. This patent should be carefully considered in order to put the present invention into proper perspective.

Presently, conveyor belt material is manufactured in a single width (usually two or three meters) and then is slit longitudinally, as necessary, to provide conveyor belting of narrower widths. This is true regardless of whether the conveyor belting is heavy duty "black" belt used for handling and conveying heavy or course materials, or lighter weight "white" belt used for handling lightweight items or food products.

A large roll of uncut belting material, sometimes referred to as a slab, can weigh between 10,000 and 30,000 pounds. Consequently, handling of this material through a slitting apparatus can be cumbersome and difficult to control. Most of these difficulties are due in large part to the sheer weight of the roll of material being handled. For example, very high torque is required to wind and unwind such a roll of belting material. Once such a roll has been set into motion, the inertia of its mass makes it equally difficult to stop with precision. Likewise, lateral repositioning of such a roll in order to maintain a uniform cut width also presents difficulties. Despite these difficulties, precise slitting is imperative.

In general, with the apparatus disclosed in the previously-mentioned '756 patent, an unslit roll of belt is carried on a first spindle, and the subsequently-slit belt is wound onto a second spindle. Between the two spindles, is the cutting apparatus having one or more cutting blades spaced laterally along the cutting apparatus. A series of rollers feed the belting material past the cutting blade. The rollers are responsible for pulling and pushing the belt material past the cutting apparatus, thereby maintaining even longitudinal and lateral tension on the web of belt.

Manufacturers of belting material have found that belting material can be more economically produced in wider widths. As previously discussed, these widths can be as great as four meters, compared to previous standard widths of approximately two meters. This increase in width accounts for the proportionate increase in weight for a roll of belting material of a given length. Despite the increased production width of belting material, the core onto which such belting is rolled has not changed substantially.

Pursuant to industry standard, conveyor belting is rolled onto a cylindrical core having a square-shaped axial passageway. A square core bar is inserted through the passageway of the core to act as a spindle on which the roll can be supported. The square shape of the core bar allows the roll to be driven by hydraulic motors or the like.

With three-meter wide belt, it is not unusual that a roll will tend to sag under its own weight (up to 10,000 pounds) when the core bar is supported only at opposite ends. This tendency to sag is complicated by the fact that the core bar has a square cross-sectional shape. When the core bar is positioned such that upper and lower sides of the square are horizontal and lateral sides are vertical, the bar is more susceptible to more bending than when the bar is rotated 45° therefrom. When the core bar is rotated 45°, each panel of the core bar is positioned diagonally relative to horizontal. In other words, as the core bar is rotated from a position in which its cross section is "square" to a position where its cross section is "diamond-shaped," its ability to resist bending changes. This is due to the effective change in vertical dimension of the core bar from one position to the other. Consequently, a roll of belting material can tend to "wobble" between positions of lesser and greater sag as it is rotated on the spindle of the slitting apparatus. This wobble causes undesired fluctuation in the tension of the belt as it is being slit, making subsequent control of the belt at the cutting apparatus more difficult.

Wobbling also complicates the coupling of the end of a core bar to a drive motor. As the central portion of the core bar sags, the outer ends of the core bar rise, because bearings support the core bar at points spaced inwardly from the core bar ends. The coupling of a drive motor to a vertically-oscillating core bar end can be difficult when the load carried by the core bar is relatively heavy. The previously-described sagging and "wobble" effect becomes significant as the weight and diameter of the outfeed roll increase.

Another problem encountered when two or more webs of slit belting material are subsequently wound onto the same spindle is that minute lateral shifting of the webs will cause the slit ends of the web layers to overlap slightly a previous layer, thereby making separation of the slit webs extremely difficult.

It is an object of the present invention to address these and other problems existing in prior art belt-slitting devices. The solutions provided by this invention will become apparent upon the reading of the following specification, drawings, and claims.

DISCLOSURE OF THE INVENTION

The belt-slitting machine of the present invention includes a work table or platform across which the belt material is moved and cut into webs of belt material of narrow width. First and second carriages are positioned at opposite ends of the machine, and each carriage includes a pair of movable lift arms for supporting a spindle or core bar. The first carriage supports a supply roll of belt material, and the second carriage supports the slit rolls of belt material. A drive mechanism is provided for moving the belt material across the work table. A separate motor is provided on each carriage to rotate the spindle of each carriage in order to control the rate of unwinding and rewinding of the belt material. A cutter apparatus is positioned above the work table, and it includes one or more cutter disks or blades for cutting the belt material into narrow width webs of belt material. The spindles for the supply and takeup rolls are substantially square in cross section and are supported by the lift arms of the carriages adjacent to and inwardly of the ends of the spindle. A coupler assembly is provided between one or both ends of each spindle and that spindle's associated drive motor or motors. The coupler assembly includes a first coupler engaged by the motor gearbox and a second coupler engaged by the spindle. The first and second couplers include a tab-and-groove arrangement for slidably interconnecting one another for relative linear movement along a first axis transverse to the spindle. The second coupler includes a channel for providing sliding relative movement between the second coupler and the end of the spindle along a second axis. The first and second axes are substantially perpendicular to each other. This arrangement provides for vertical deflection of the spindle end that is driven. As the spindle end deflects, the end slides within the slide coupler channel, and the tab-and-groove arrangement allows linear movement between the couplers.

The engaging surfaces of the first and second couplers are tapered away from each other so that the couplers can angularly deflect with respect to each other while maintaining the tab-and-groove interengagement between the couplers. As the couplers angularly deflect, the tapered coupler surfaces allow the tab-and-groove arrangement to remain interconnected. As a result, positive torque is provided continuously to the spindle.

In addition, an automatic edge position control means is provided for detecting the position of an edge of the belt material relative to the cutter disks. The edge position control means includes a lateral shift cylinder for moving the spindle laterally in order to reposition the supply roll for proper alignment with the cutter disks, thereby maintaining a uniform cut width. An outfeed belt divider apparatus is provided for maintaining alignment of cut edges of the belt as it is wound to a roll at the outfeed end of the machine.

The outer faces of the first and second couplers can be either tapered or convex in a manner so as to provide for angular deflection between the first and second couplers as the spindle bends due to the weight of the belt material.

According to an aspect of the invention, an elongated slot is provided in the second coupler for receiving a headed fastener, and the first coupler is provided with a threaded opening for receiving the fastener in order to interconnect the first and second couplers. The second coupler includes a shoulder region, which engages the headed fastener and prevents the second coupler from becoming displaced relative to the first coupler.

According to another aspect of the invention, the outfeed belt divider apparatus includes divider disks mounted on a shaft movably supported above and in alignment with the takeup roll. The disks are spaced in alignment with the slits made in the belt material, and the shaft is adapted to rest on the webs of belt material as the webs wind into a roll supported on the spindle. The disks remain positioned between the edges of the winding webs of belt material in order to ensure that the rolls are formed in a uniform manner.

According to another aspect of the invention, the edge position control means includes a pair of photodetectors laterally spaced from each other and positioned at one side of the work table. The photodetectors are positioned where the edge of the infeeding belt material moves across the work table. One photodetector is positioned above the edge of the belt material, and the second photodetector is positioned beyond the edge of the belt material. Should the edge of the belt material move either way beyond one of the photodetectors, the carriage supporting the supply roll of belt material is repositioned in response to the photodetectors in order to reposition the supply roll and, in turn, to realign the belt material with respect to the cutter disks.

Other features and advantages of the present invention will become apparent from the following detailed description of the best mode and the accompanying drawings, and the claims, which are all incorporated herein by reference as part of the disclosure of the invention.

BRIEF DESCRIPTION OF THE DRAWINGS

In the drawings, where like numerals refer to like parts throughout the several views.

FIG. 2 is a side elevation view of the spindle and its bearings, which support a supply roll of belt material that is to be cut by the belt-slitting machine of FIG. 1;

FIG. 3 is a view like FIG. 2, shown with a supply roll, in phantom lines, causing an appreciable amount of bending in the spindle;

FIG. 4 is a cross-sectional view of a core and a spindle (core bar), shown with the spindle having its sides horizontal and vertical, in which position bending of the spindle is at a maximum;

FIG. 5 is a view like FIG. 4, showing the spindle with its sides rotated 45° as shown in FIG. 4, in which position bending of the spindle is at a minimum;

FIGS. 7A–7J are schematic views illustrating the relative movements between an end of a spindle and the sliding coupler, and between the sliding coupler and the shaft coupler;

BEST MODE FOR CARRYING OUT THE INVENTION

Figure 1:
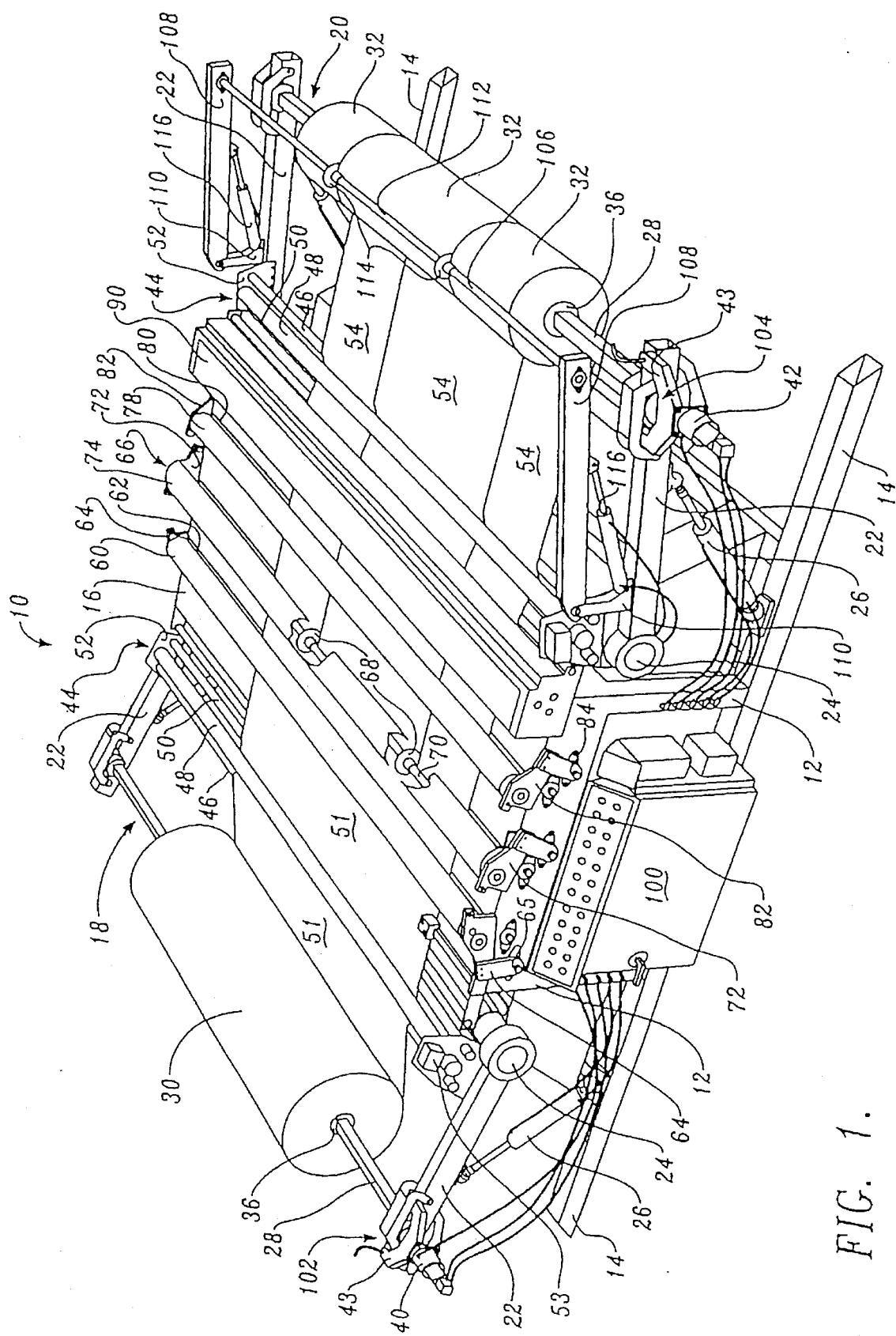
FIG. 1 is a pictorial view of the belt-slitting machine of the present invention.

Referring now to the figures, in FIG. 1, a belt-slitting machine 10 is shown comprising a table frame 12 attached to two bases 14. Frame 12 supports a work table platform 16 positioned centrally of belt-slitting machine 10. Various pressure and tension rollers, and cutter devices are positioned about work table 16. The belt-slitting machine 10 is an improvement of the belt-slitting machine disclosed in U.S. Pat. No. 3,685,756. The basic structure of the improved belt-slitting machine is similar to the machine of the '756 patent. Accordingly, the present machine shall be discussed generally and with particular emphasis directed to the improvements.

At one end of belt-slitting machine 10, a belt supply roll carriage 18 is positioned, and at the opposite end of belt-slitting machine 10 a belt takeup roll support carriage 20 is positioned. Support carriages 18, 20 each include a pair of laterally spaced lift arms 22 mounted at the outer ends of pivot shafts 24. Hydraulic cylinders 26 raise and lower lift arms 22. The lower ends of cylinders 26 are mounted to base 14, and the upper ends of cylinders 26 are mounted to lift arms 22. Cylinders 26 raise and lower lift arms 22.

The distal ends of lift arms 22 support spindle shafts 28. Spindles 28 carry a supply roll 30 of belt material and takeup rolls 32. For purposes of this description, the term supply roll means a roll of belt material received from a belt manufacturer and may be as much as three to four meters in width, and weigh as much as 30,000 pounds. However, supply rolls of any lesser width or lighter weight can also be handled by the belt-slitting machine 10.

Cylindrical cores 36 support the belt rolls 30, 32 on spindles 28. Core 36 for rolls 32 can comprise more than one core, one for each web of slit belt material. Spindles 28 are rectangular, preferably square, in cross section, and cores 36 include a corresponding rectangular passageway therethrough for receiving spindles 28. Hydraulic motor and gearbox 40 rotates supply roll 30, and hydraulic motor and gearbox 42 rotates takeup rolls 32. Brackets 43 mount motors/gearboxes 40, 42 to the ends of lift arms 22.

The pairs of lift arms 22 each support tension rollers 44. Tension rollers 44 each include three roller bars 46, 48, 50 journaled at their ends in support brackets 52. The belt material 51 serpentines through rollers 46, 48, 50 as belt material 51 moves onto and off of work table 16. Rollers 48 each include a load disk transducer 53 to sense belt tension around rollers 48, so that the rotation speeds of spindles 28 can be adjusted to control belt tension across work table 16.

Mounted centrally of the machine about work table 16 are a first pinch roller 60 and first drive roller 62. Pinch roller 60 is positioned above drive roller 62. First pinch roller 60 is journaled between a pair of support arms 64, which are secured to a pivot shaft 65. Shaft 65 is rotatably mounted to frame 12 and is pivoted by a conventional pneumatic actuator (not shown). Drive roller 62 is rotatably mounted in frame 12 and is driven by a chain drive (not shown). Support arms 64 are pivotable downwardly to move first pinch roller 60 onto belt material 51 and upwardly to raise first pinch roller 60 above work table 16. Work table 16 includes an elongated slot in which first drive roller 62 is positioned to engage belt material 51.

A cutter apparatus 66 is positioned above work table 16 adjacent rollers 60, 62. Cutter apparatus 66 includes a set of cutter disks 68 mounted on shaft 70 rotatably supported between arms 72. Arms 72 can be pivoted downwardly toward work table 16 and upwardly away therefrom by means not shown. A guard 74 is provided over cutter apparatus 66 for protection. Cutter disks 68 are spaced along shaft 70 at selected positions to cut belt material 51 into narrow width strips or webs 54.

A second pinch roller 78 and a second drive roller 80 are provided adjacent cutter apparatus 66 opposite first pinch roller 60 and first drive roller 62. Roller 78, 80 are similar to roller 60, 62. Preferably, drive rollers 62, 80 are provided with rubberized surfaces to enhance engagement with belt material 51 and webs 54. Second pinch roller 78 is rotatably mounted between support arms 82, which are secured to a pivot shaft 84. Shaft 84 is rotatably mounted to the frame 12 and is pivoted by a conventional pneumatic actuator (not shown). Second drive roller 80 is rotatably mounted in the table frame 12 and is driven by the chain drive for first drive roller 62 (not shown).

To control tension on the belt material 51 at the cutter disks 68, preferably the diameter of second drive roller 80 is slightly greater than the diameter of first drive roller 62. By rotating drive rollers 62, 80 from a common drive motor, second drive roller 80 will pull on belt material 54 at a slightly faster rate than first drive roller 62 pulls on belt material 51. In this manner, slight tension is provided on the belt material 51 as it is being moved past cutter disks 68.

A conventional chain-driven cutter assembly 90 is provided for cutting belt material 51 transversely. A conventional measuring device can be provided to count the length of belt material being slit so that the operator may remove the cutter when the desired length is cut.

In operation, motor/gearbox 40 rotates spindle 28 to feed belt material 51 from supply roll 30 through the machine. Motor/gearbox 42, at the same time, rotates spindle 28 to take up the slit belt material 54. Belt material 51 is fed through the first set of tensioning rollers 44 in a serpentine fashion and onto the work table 16. The belt material is fed between first pinch roller 60 and first drive roller 62 and underneath cutting apparatus 66. Cutting disks 68 cut belt material 51 lengthwise to produce two or more webs of belts 54 of lesser width than supply roll 30. The slit belt material 54 is fed between second pinch roller 78 and second drive roller 80 and past the transverse cutter 90.

The slit belt material 54 then feeds through the second set of tensioning rollers 44 and is wound around the core 36 carried by spindle 28 of support carriage 20. Transverse cutter 90 then cuts the slit belt material transversely to sever the material.

Most of the components of the machine are hydraulically or pneumatically powered for ease of operation and versatility. For this purpose, a control console 100 is provided centrally of the machine to give an operator push button control of all stages of the belt-slitting operation. Various pumps, motors, fluid and air supplies are required for the operation of the machine and are not shown for clarity.

A coupler assembly 102 is provided between drive motor and gearbox 40 and spindle 28 of carriage 18, and a similar coupler assembly 104 is provided between drive motor and gearbox 42 and spindle 28 of carriage 20. Coupler assemblies 102, 104 are discussed in more detail later. In addition, an outfeed belt divider apparatus 106 is provided on support carriage 20. Outfeed belt divider apparatus 106 includes a pair of arms 108 pivotally secured to supports 110, which are mounted to lift arms 22. A belt divider shaft 112 is rotatably journaled at the distal ends of arms 108. Shaft 112 carries divider disks 114, which are discussed in more detail later. Generally, divider disks 114 keep the slit webs of belt material 54 separated as they wind around the core 36 of carriage 20. Arms 108 are raised and lowered by pneumatic actuators 116 as rolls 32 increase in size.

In FIG. 2, the spindle 28 is shown unsupported by lift arms and without a supply roll of belt material mounted thereon. A sleeve bearing 118 is positioned spaced inwardly from each end of spindle 28. Sleeve bearings 118 are carried by the lift arms. This arrangement allows a drive motor to be coupled at one end of spindle 28 to rotate the spindle about its central longitudinal axis 119. As shown in FIG. 3, certain types of belt material 30 can be sufficiently heavy to cause spindle 28 to bend along its central portion as belt material is fed out from the supply roll onto the work table. When the spindle 28 bends or sags due to the weight of a supply roll 30, the ends of the spindle 28 are angularly deflected from horizontal, as represented by angle θ. In addition, the ends of spindle 28 are raised or lifted vertically from the central longitudinal axis of rotation 119. This amount of vertical deflection is represented by distance Y.

Since spindle 28 is not round in cross section, the vertical deflection Y varies between a minimum and a maximum as spindle 28 rotates. The deflection Y varies due to the fact that the deflection of a beam, such as spindle 28, is inversely proportional to the height or radius R of the beam, as measured from a neutral axis 114. In other words, the rigidity of a beam is a function of the height of the beam about the neutral axis of deflection 114. As shown in FIG. 4, radius R' of spindle 28 is at a minimum about neutral axis 114 when spindle 28 has a "square" cross section with respect to neutral axis 114. As shown in FIG. 5, radius R" is at a maximum when spindle 28 has a "diamond-shaped" cross section with respect to neutral axis 114. The height of the cross section of spindle 28 varies between R' and R" as spindle 28 rotates. Thus, the deflection is greatest when the spindle 28 reaches a "square" cross section, and is at a minimum when the spindle 28 reaches a "diamond" cross section. As a result, spindle 28 tends to wobble as it rotates. The core 36, preferably being made of particle board, contributes negligible strength to limit deflection. It should be noted that as the belt material unwinds from supply roll 30 (or rolls up into rolls 32), the minimum and maximum deflections Y of the ends of spindle 28 will change in value. It should also be noted that for extremely lightweight belt material, the deflection Y at all times may be considered negligible. It should also be noted that as the width of the supply roll 30 varies, so does the deflection Y.

As a consequence of both the angular θ and vertical deflection Y of the ends of spindle 28, drive couplers 102, 104 are provided between drive motors/gearboxes 40, 42 and spindles 28. The coupler assemblies 102, 104, indicated in FIG. 1, essentially are similar, and each comprises a sliding coupler and a shaft coupler, which interconnect together and couple between drive motors/gearboxes 40, 42 and spindles 28 to provide positive torque from the motors to the spindles as the spindles deflect.

Figure 6A:
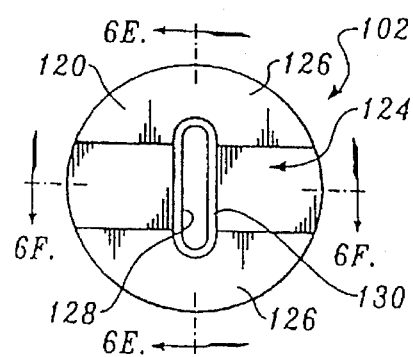
FIGS. 6A and 6B are front and back views of a sliding coupler.
Figure 6B:
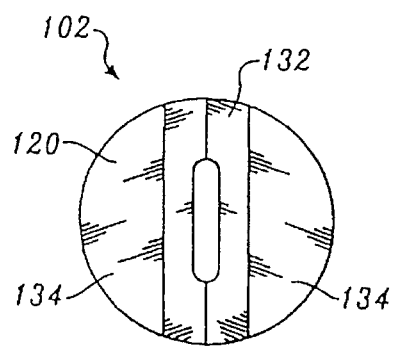
Figure 6C:
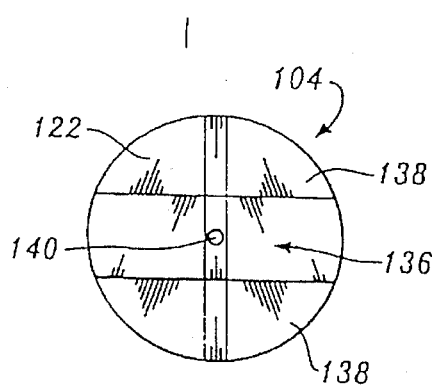
FIGS. 6C and 6D are front and back views of a shaft coupler, which couplers are positioned between one end of the spindles shown in FIGS. 2 and 3 and drive motors and gearboxes that rotate the spindles.
Figure 6D:
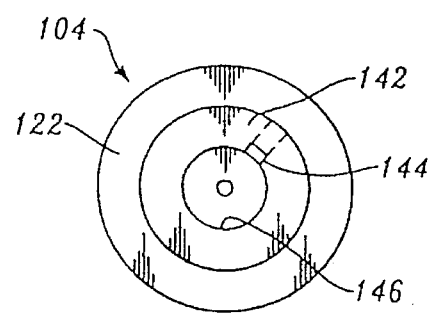

FIGS. 6A and 6B are front and back views of the sliding coupler 120, and FIGS. 6C and 6D are front and back views of the shaft coupler 122. Sliding coupler 120 is a circular component, and its front face, shown in FIG. 6A, includes a slot or channel 124 defining raised outer surfaces 126. An elongated fastener slot 128 extends transversely to channel 124 entirely through slide coupler 120. Slot 128 is defined by a shoulder region 130. Slot 128 is provided for receiving a fastener, such as a bolt, which is secured to shaft coupler 122 to interconnect the two couplers 120, 122. As shown in FIG. 6B, the back side of sliding coupler 120 includes a tab or ridge 132. Elongated slot 128 extends through tab 132. Tab 132 is oriented 90° rotated from channel 124 on the front side of sliding coupler 120. Tab 132 defines a pair of inner surfaces 134 on the back side of sliding coupler 120.

As shown in FIG. 6C, shaft coupler 122 also is a circular component. The front side of shaft coupler 122 includes a groove 136, which defines a pair of raised outer surfaces 138 on the front side of shaft coupler 122. A threaded fastener hole 140 is provided centrally of shaft coupler 122. As shown in FIG. 6D, the back side of shaft coupler 122 includes a collar 142. Collar 142 includes a key way 144 for securing shaft coupler 122 to the drive shaft of a drive motor. Collar 142 defines a socket 146 for receiving the drive shaft from the drive motor associated with the coupler.

The front side of shaft coupler 122, as shown in FIG. 6C, is adapted to mate with the back side of sliding coupler 120, as shown in FIG. 6B, with tab 132 received within groove 136. The tab-and-groove arrangement 132, 136 allows for linear movement between sliding coupler 120 and shaft coupler 122 along a first axis. The channel 124 in the front face of sliding coupler 120, as shown in FIG. 6A, is adapted to receive an outer end of a spindle. The width of channel 124 is slightly greater than the width of the rectangular spindle, so that a close engagement of the end of the spindle is achieved within channel 124. Channel 124 allows the end of a spindle to travel linearly with respect to sliding coupler 120 along a second axis. The second axis is oriented 90° from the first axis.

Figure 6E:
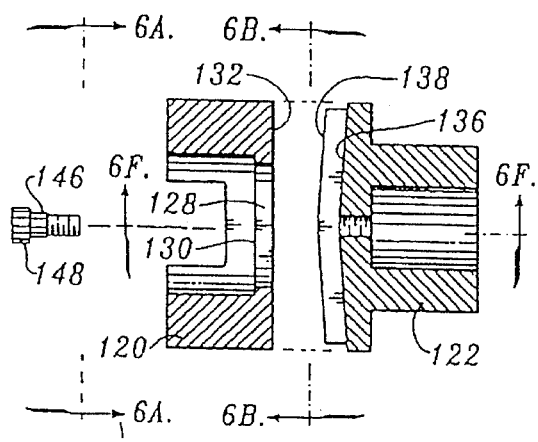
FIG. 6E is a sectional view of the couplers of FIGS. 6A–6D, shown with the sliding and shaft couplers separated.
Figure 6F:
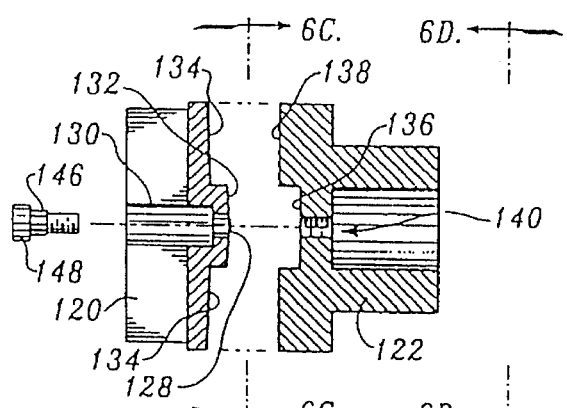
FIG. 6F is a sectional view like FIG. 6E, taken along a line rotated 90° about the central axis of the couplers.

As shown in FIG. 6E and FIG. 6F, the raised surfaces 138, as well as the surface of groove 136 taper at approximately 3½° from the center of shaft coupler 122 to the outer edges thereof. Likewise, as shown in FIG. 6F, the inner surfaces 134, as well as the surface of tab 132, taper at approximately 3½° from the center of sliding coupler 120 to the outer edges thereof. FIG. 6F is a sectional view of the couplers 120, 122 taken 90° rotated from the sectional view of FIG. 6E. Accordingly, angled surfaces 138, 136 of shaft coupler 122 taper in a direction 90° rotated from the direction of taper of surfaces 134, 132 of sliding coupler 120. This design provides angular deflection between shaft coupler 122 and sliding coupler 120 in two dimensions, so that as a drive motor rotates shaft coupler 122, sliding coupler 120 remains interconnected with shaft coupler 122 with the tab 132 closely fitted within groove 136.

A fastener 146 with a headed end 148 extends through slot 128 and is threadably connected to shaft coupler 122 by means of threaded hole 140. The headed end 148 of fastener 146 engages shoulder 130 and is slidable therealong as sliding coupler 120 moves relative to shaft coupler 122.

Figure 6G:
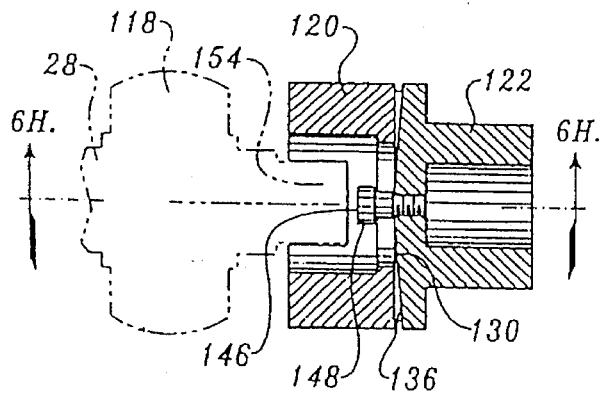
FIG. 6G is a view like FIG. 6E, shown with the couplers interconnected and shown with an end of a spindle in phantom lines engaged with the sliding coupler.
Figure 6H:
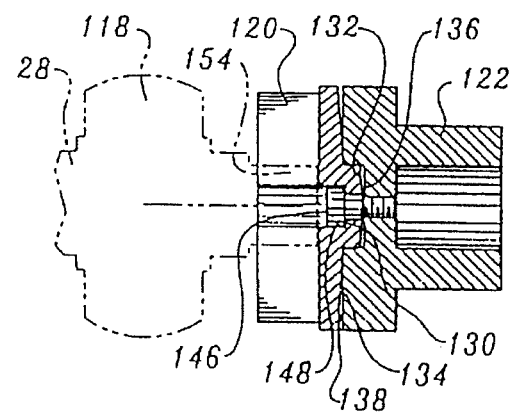
FIG. 6H is a view like FIG. 6G, taken along a line rotated 90° about the central axis of FIG. 6G.
Figure 6I:
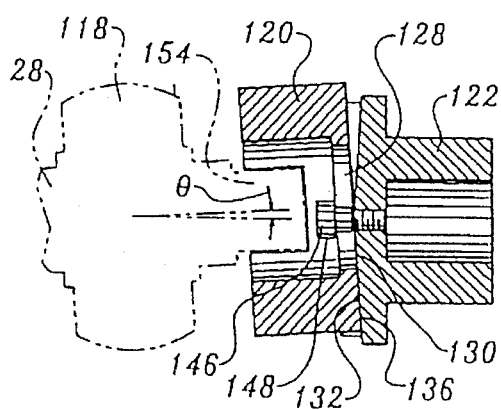
FIG. 6I is a view like FIGS. 6G and 6H, shown with the sliding coupler angularly deflected with respect to the shaft coupler.
Figure 6J:
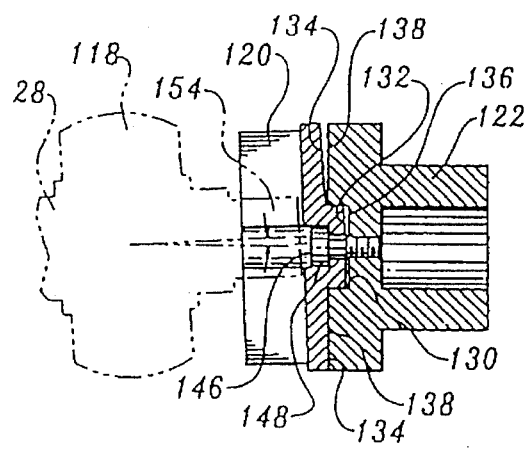
FIG. 6J is a view like FIG. 6I, taken along a line rotated 90° from the central axis of FIG. 6I, and showing the sliding coupler angularly deflected with respect to the shaft coupler.

FIG. 6G illustrates sliding coupler 120 interconnected with shaft coupler 122. The outer end 154 of a spindle 28 is illustrated in phantom lines, as is the bearing 118, which bearing is the point about which the spindle 28 angularly deflects. Fastener 146 is illustrated coupling the two couplers 120, 122 together essentially so that the two couplers do not separate from each other. The head 148 of fastener 146 rides against shoulder 130 and prevents this separation. With the two couplers 120, 122 together, tapered surface 136 of shaft coupler 122 oppose surfaces 132 of sliding coupler 120. As shown in FIG. 6H, which is a sectional view taken 90° rotated from the sectional view of FIG. 6G, tapered surfaces 134 oppose surfaces 138 of shaft coupler 122. As shown in FIG. 6I, as spindle 28 rotates and outer end 154 of spindle 28 deflects through angle θ surface 136 engages surface 132, as shown in the figure, and surfaces 138 engage surfaces 134 (not shown). Also, as spindle end 154 rises, raising sliding coupler 120 along with, fastener 146 slides along slot 128 with fastener head 148 engaging shoulder 130. FIG. 6J illustrates the angular engagement of surfaces 134 with surfaces 138, as well as the engagement of surface 132 with surface 136. The tapered surfaces 132, 134, 136, 138 allow the tab-and-groove arrangement 132, 136 to remain in close engagement as the couplers 120, 122 rotate.

As previously described, the coupler assembly of the present invention compensates for both angular deflection θ and vertical deflection Y at the end of the spindle. The manner in which vertical deflection is compensated will be described with reference to FIGS. 7A–7J.

Referring first to FIG. 7A, the coupler assembly 120, 122 is shown schematically from an axial view. For purposes of illustration, FIG. 7A shows the couplers 120, 122 and spindle 28 at a starting position of 0° of rotation, with couplers 120, 122 superimposed. In this position, vertical deflection of spindle 28 is facilitated by its movement along channel 124 in the face of sliding coupler 120. For purposes of illustration, this linear movement is indicated to be along line A. Horizontal deflection would be facilitated by relative movement between sliding coupler 120 and shaft coupler 122 along line B. Although the coupler assembly of the present invention is capable of compensating for both vertical and horizontal deflection simultaneously, for ease of illustration, the following discussion will relate to vertical deflection only.

As previously described, when spindle 28 is situated such that upper and lower walls are horizontal and sidewalls are vertical, it has minimum resistance to bending and, therefore, maximum deflection. As illustrated in FIG. 7A, spindle 28 is shown at a maximum upward vertical deflection, which is exaggerated for purposes of illustration. Referring to 7B, if the X axis of a typical cartesian plane represents horizontal deflection and the Y axis represents vertical deflection, it can be seen that line A will correspond directly to the Y axis and line B will correspond directly to the X axis. As previously assumed, for purposes of illustration, there is no horizontal deflection of spindle 28 and, therefore, the X value is always equal to zero. The Y value represents the amount of deflection from the true axis of the coupler assembly and spindle.

Because gravity is the most significant force causing vertical deflection of spindle 28, deflection of the spindle end 154 always is upward. Accordingly, the Y value is always a positive value.

For ease of explanation, FIGS. 7E and 7F will be described prior to the explanation of FIGS. 7C and 7D. In FIG. 7E, the coupler assembly has rotated 90° from the starting position. In this position, the end of the spindle 154 is again at is maximum deflection and the entirety of this deflection is compensated by the relative movement between slide coupler 120 and shaft coupler 122 along line B. Again, because there is presumed to be no horizontal deflection, there is no relative displacement between the end of the spindle 154 and slide coupler 120 in groove 124 on the face of the slide coupler 120 and corresponding to line A. By reference to the vector illustration in FIG. 7F, again it can be seen that the X "horizontal" value is zero and the Y "vertical" value is positive and indicates maximum deflection Ymax. A comparison of FIGS. 7B and 7F show that the only difference between the two is the A and B axes have been interchanged due to the 90° of rotation.

Referring to FIG. 7I, therein it can be seen that the coupler assembly and spindle have rotated 180° from the original position. In this position, the end of the spindle 154 again is at maximum deflection, facilitated totally by relative movement of spindle end 154 along channel 124 in the face of slide coupler 120. For all practical purposes, FIG. 7I appears to be equivalent to FIG. 7A. The only difference is that the end of the spindle is now physically located in the part of the slide coupler channel, which was previously oriented downwardly. FIG. 7J is identical to FIG. 7B in its vector representation now that the lines of relative movement A and B have returned to their original orientation relative to X and Y.

A more complicated situation exists when rotation of the coupler assembly and spindle are in between the previously-described positions. These in-between positions are complicated by the varying amount of deflection of the spindle end and because the directions of relative linear movement along lines A and B no longer directly correspond to the X and Y horizontal and vertical axes. Instead, at these in-between positions the deflection of the spindle end is facilitated by a combination of the relative movements between the spindle end and the slide coupler and the relative movements between the slide coupler and shaft coupler.

Referring now to FIG. 7C, therein the coupler assembly 120, 122 and spindle 28 is shown rotated 45° from the original position. In this position due to the change in orientation of square-shafted spindle 28, spindle 28 is at its minimum deflection. It should be noted that even at its minimum, there is some vertical deflection from the central axis of the coupler assembly. Again, the degree of this deflection is exaggerated for purposes of illustration.

Referring now also to FIG. 7D, in this orientation, the vertical deflection is along the Y axis and, again, no horizontal deflection along the X axis is assumed. The direction of linear movement between the end of the spindle 154 and slide coupler 120 along "line A" remains perpendicular to the line of relative movement between slide coupler 120 and shaft coupler 122 along "line B". These directions of linear movement "lines A and B", however, are diagonal to the vertical line of deflection "Y" of the end of the spindle. Again, no horizontal deflection is assumed. In order to facilitate the vertical deflection of spindle end 154, a combination of linear relative movements between slide coupler 120 and shaft coupler 122 and between slide coupler 120 and spindle 28 are required.

Referring to 7D, it can be seen that the vector Ymin representing the vertical displacement of the spindle end 154 is the sum of two diagonal vectors $V_1$, $V_2$ extending along lines A and B. Because the value of X may remain at zero, the absolute value of X for each of these diagonal vectors is equal, one being positive and the other negative. Vector $V_1$, which extends in the direction of line A, represents the displacement of the spindle end 154 relative to slide coupler 120 from a neutral position. Vector $V_2$, which extends along line B, represents the extent of relative displacement between slide coupler 120 and shaft coupler 122. Each of these are schematically illustrated in FIG. 7D. The sum of these vectors is the vertical displacement vector Ymin, which has a Y value greater than the length of either of the other two vectors and an X value that is zero.

In the example illustrated in FIGS. 7C and 7D, the length of the two vectors from the neutral position is zero. This is because after 45° of rotation, lines A and B are exactly halfway between the X and Y axes. At any other degree of rotation between 0° and 90°, the Y value of each of these two vectors would be different from one another, although the X values must still have a zero sum. Schematically, this may be represented by displacement between slide coupler 120 and shaft coupler 122 being greater than or lesser than the displacement between the end of the spindle 154 and slide coupler 120. In each case, the displacement represents its distance along lines A and B relative to a neutral or axially-aligned position.

Referring now to FIGS. 7G and 7H, after the rotation has passed the 90° point, displacement of the spindle end 154 relative to the slide coupler 120 along line A is in the opposite direction than that shown in FIGS. 7C and 7D. Likewise, displacement of slide coupler 120 relative to the shaft coupler 122 is in the opposite direction along line B. Actual displacement of the spindle end 154 relative to a neutral position, however, is in the upward, or positive Y value, direction due to the inversion of the coupler assembly after rotation.

Reference to FIG. 7H shows that the actual vertical deflection of the spindle is shown by vector Ymin along the Y axis. This vector is the sum of the vectors $V_3$, $V_4$, which extend along lines A and B. Again, the absolute value of X for each of these vectors must be equal such that the sum of the X values is always zero. Again, as was the case in FIG. 7D, the Y values of each of these vectors $V_3$, $V_4$, are added to total the Y value of vector Ymin representing actual vertical displacement.

If the vertical deflection of spindle 28 were constant, such as in the case of a spindle having a circular cross section, the sum of the Y values of the two vectors would always be constant. The coupler assembly of the present invention, however, compensates for a constantly varying amount of vertical deflection. In this case, vertical deflection is not only affected by the cross-sectional shape of the spindle, but also by the fact that as the conveyor belt is added to or removed from the infeed and outfeed rolls, the total weight of the roll, which causes bending in the spindle, is constantly changing. This variable, in combination with the varying resistance to bending of the square cross section spindle and in combination with the aforementioned varying degree of angular deflection at the end of the spindle, creates an extremely complex mechanical situation. Accordingly, the mathematical equation representing this situation would also be quite complex. In order to provide clarity in the explanation of this invention, its ability to compensate for each of these variables has been addressed separately.

Figure 8:
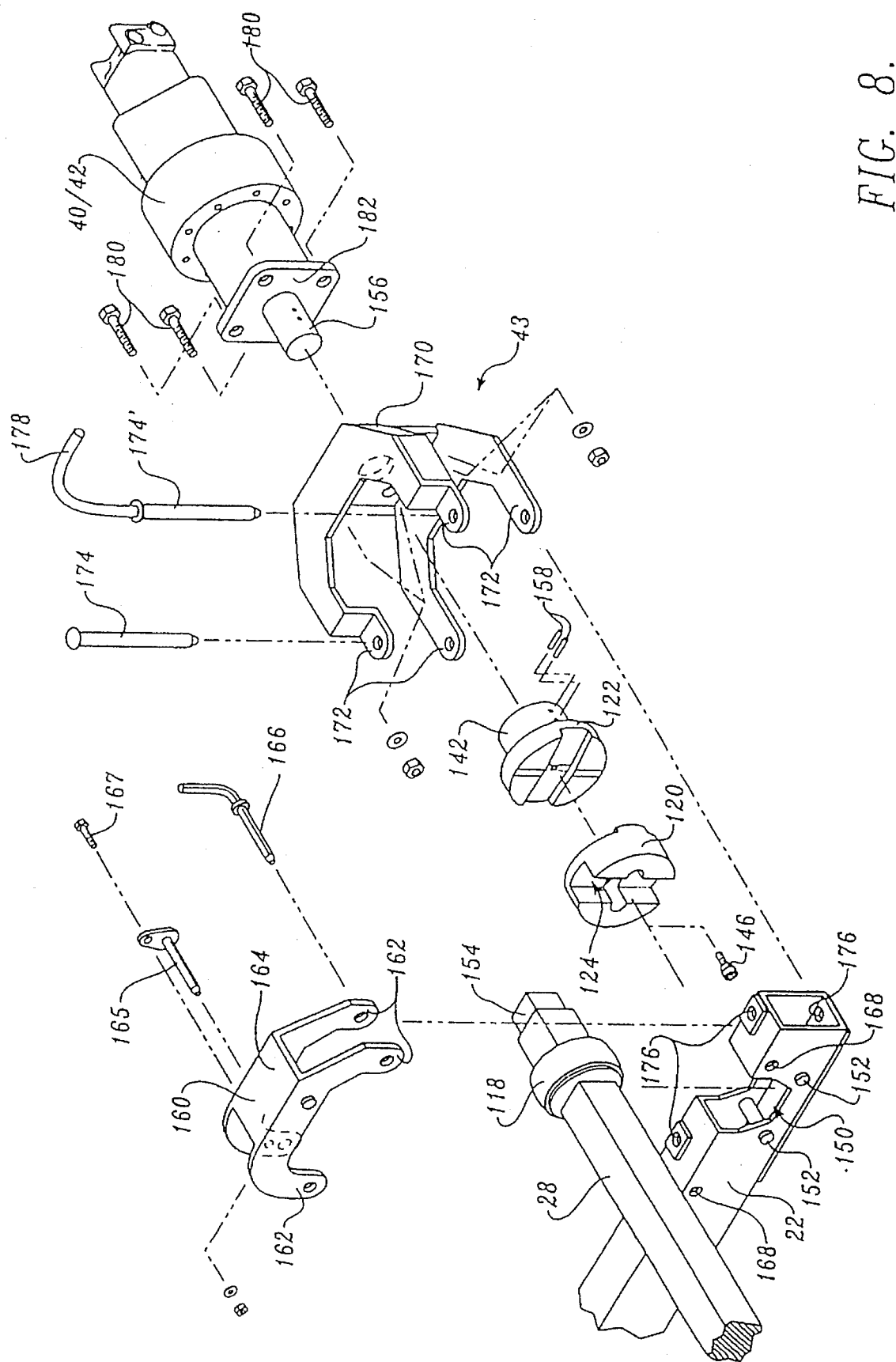
FIG. 8 is an exploded view of a mounting arrangement for a drive motor and the coupler assembly of FIGS. 6A–6D.
Figure 9:
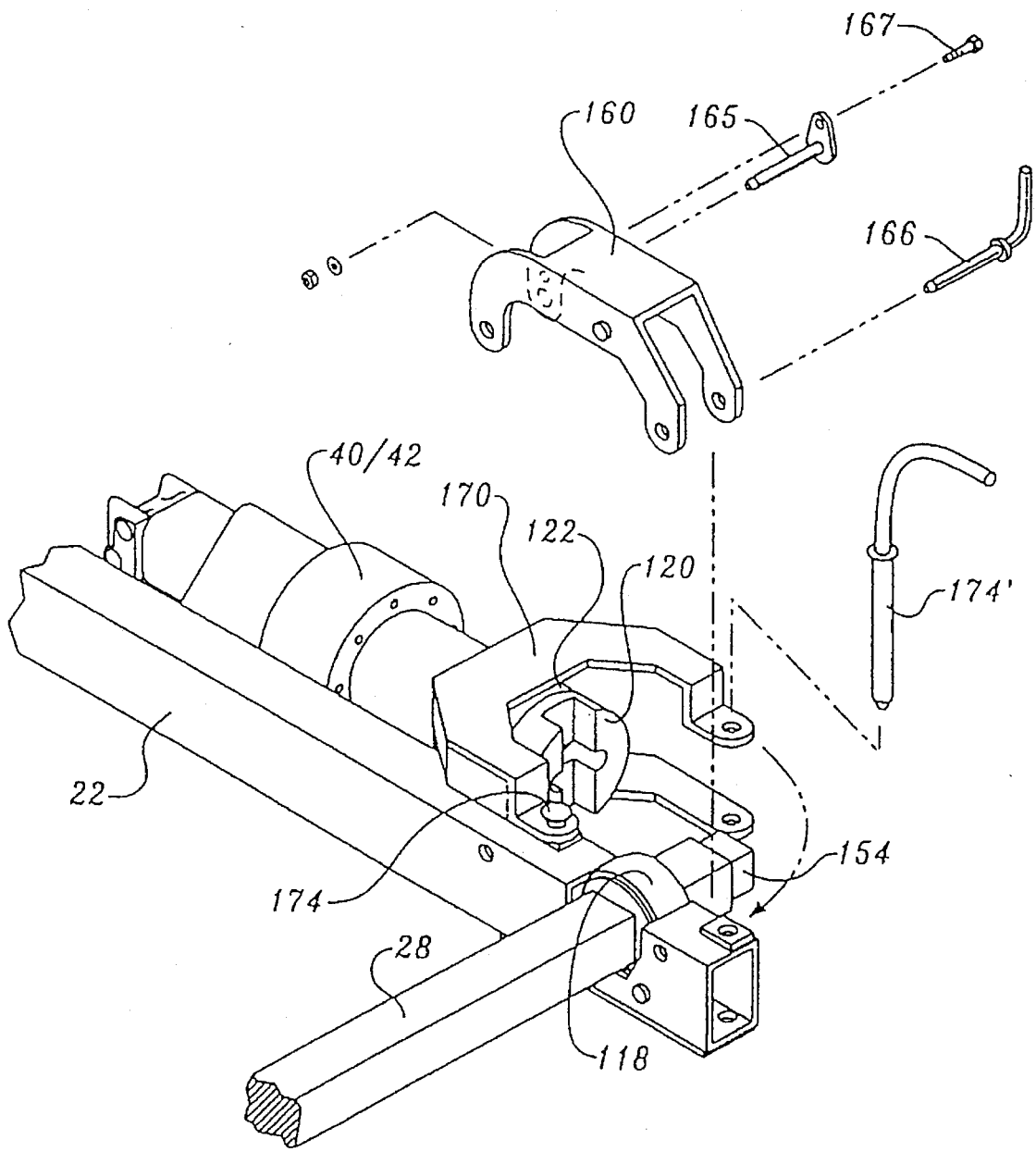
FIG. 9 is an assembled view of the mounting arrangement of FIG. 8, shown with the motor and its mounting bracket swung away from the end of a spindle.
Figure 10:
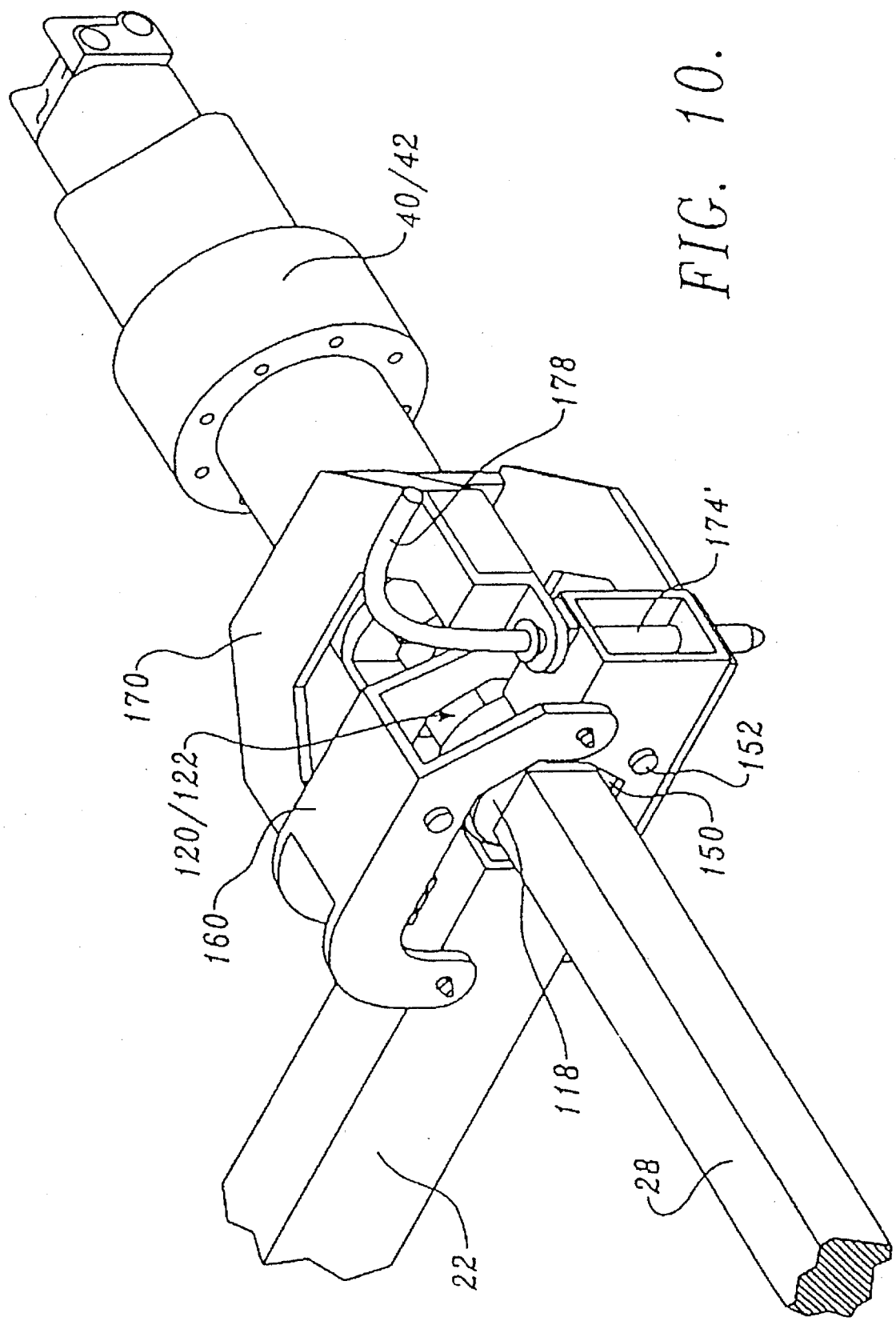
FIG. 10 is an assembled view like FIG. 9 shown with the motor and coupler assembly interconnected with a spindle.

FIGS. 8–10 illustrate the mounting arrangement 43 for a spindle 28 and a motor/gearbox 40 or 42 to a lift arm 22. The distal end of lift arm 22 includes an upwardly disposed notch region 150 for receiving a sleeve bearing 118 on spindle 28. Notch region 150 is slightly larger than the dimension of sleeve bearing 118 to allow spindle 28 to be easily mounted onto the lift arms. Support bars 152 are secured within lift arm 22 below notch region 150 and are spaced from each other a distance less than the diameter of sleeve bearing 118. Support bars 152 carry sleeve bearing 118.

The narrower dimensioned rectangular end 154 of spindle 28 is received within groove 124 of sliding coupler 120. Sliding coupler 120 and shaft coupler 122 interconnect, as previously discussed. The collar 142 of shaft coupler 122 is secured to motor/gearbox shaft 156 by set screws 158. An upper bracket 160 includes four legs 162 and an upper plate 164. Upper bracket 160 is secured to lift arm 22 by means of pins 165, 166, which extend through holes 168 in lift arm 22. Pin 165 is secured to upper bracket 160 by bolt 167. Pin 166 has a handle for easy removal of the pin. Upper bracket 160 functions to contain bearing 118 and spindle 28 within notch region 150. Spindle 28 can be removed from lift arm 22 by removing one of the pins 166 and swinging bracket 160 away from notch region 150.

An outer swing bracket 170 includes legs 172 that are secured by pins 174 to lift arm 22 via holes 176. Pin 174' includes a handle 178 for removing pin 174' from lift arm 22, whereby swing bracket 170 can swing outwardly from lift arm 22 in order to move motor/gearbox 42 and couplers 120, 122 away from the outer end 154 of spindle 28. Four bolts 180 secure motor/gearbox 42 and mounting plate 182 to swing bracket 170.

As shown in FIG. 9, removal of pin 174' and upper bracket 160 allows motor/gearbox 42 and couplers 120, 122 to be disengaged from spindle 28 by pivoting motor/gearbox 42 about pin 174. In this manner, spindle 28 can be easily mounted onto and removed from lift arms 22, as supply rolls of belt material are replaced when spent or interchanged for other types of belt material. The hydraulic lines (shown in FIG. 1) for powering motors/gearboxes 40, 42 are provided with sufficient slack to allow motors/gearboxes 40, 42 to swing away from spindles 28.

FIG. 10 shows the assembly in its operating configuration with motor/gearbox 42 and couplers 120, 122 in line with the spindle 28. In operation, as motor/gearbox 42 drives spindle 28, motor/gearbox 42 remains fixedly secured to lift arm 22 by means of bracket 170. Shaft coupler 122 is fixedly secured to motor/gearbox 42 and rotates therewith. Sleeve bearing 118 rests in notch 150 as spindle 28 rotates. The spindle end 154 (not shown in FIG. 10) and sliding coupler 120 are allowed to deflect angularly and vertically as spindle 28 sags.

Figure 11:
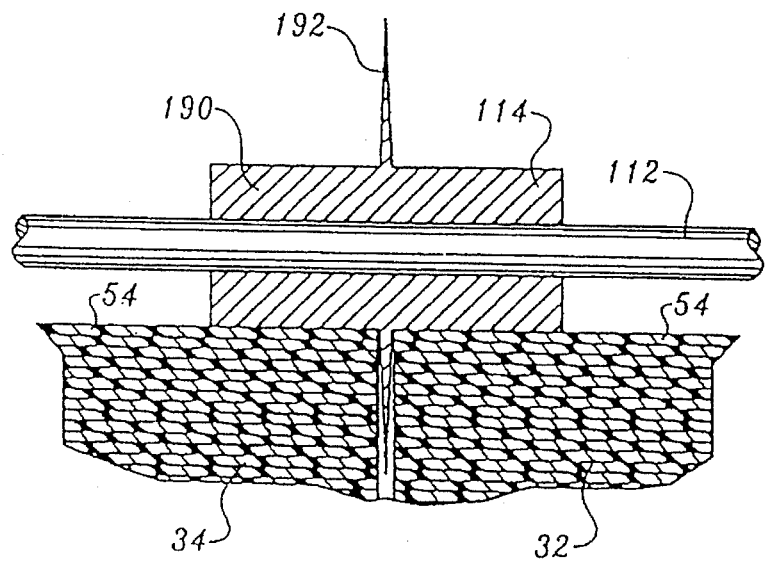
FIG. 11 is an enlarged sectional view of a divider disk positioned between two forming rolls of slit web material.
Figure 12:
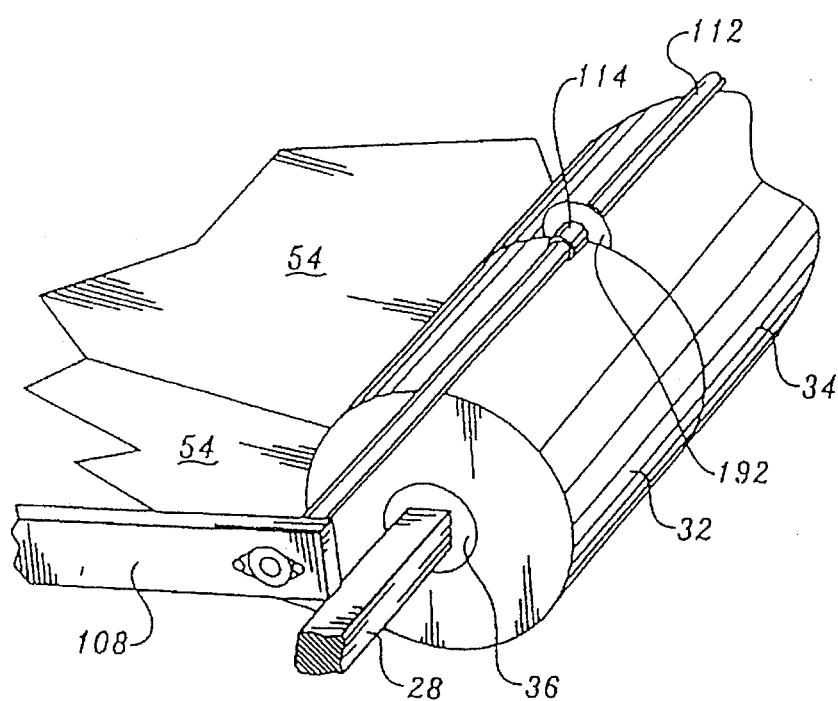
FIG. 12 is a fragmentary pictorial view of the outfeed belt divider apparatus, illustrating a divider disk positioned between two forming rolls of slit web material.

FIG. 11 is a sectional view showing a divider disk 114 mounted on a shaft 112. Divider disk 114 includes a hub 190 and a divider blade 192. Divider disk 114 can be secured to shaft 112 by any suitable means, such as a set screw (not shown). Hub 190 rests on belt material 54 as the belt material winds around the spindle into takeup rolls 32. As rolls 32 are formed, blade 192 keeps the rolls separated and ensures that the edges of each roll are even or flush. As rolls 32 grow in size, divider disk 114 rises due in part to the upward force of the rolls, as well as to the force provided by the pneumatic cylinders controlling the movement of the outfeed belt divider apparatus. As shown in FIG. 12, the leading edge of blade 192 guides the edges of the webs of belt material 54 as they roll around and form rolls 32. This ensures that the outermost loop of web material is positioned around roll 32 aligned with the previous loop of web material. As a result, a uniform roll of belt material is formed with the edges being flush.

Figure 13:
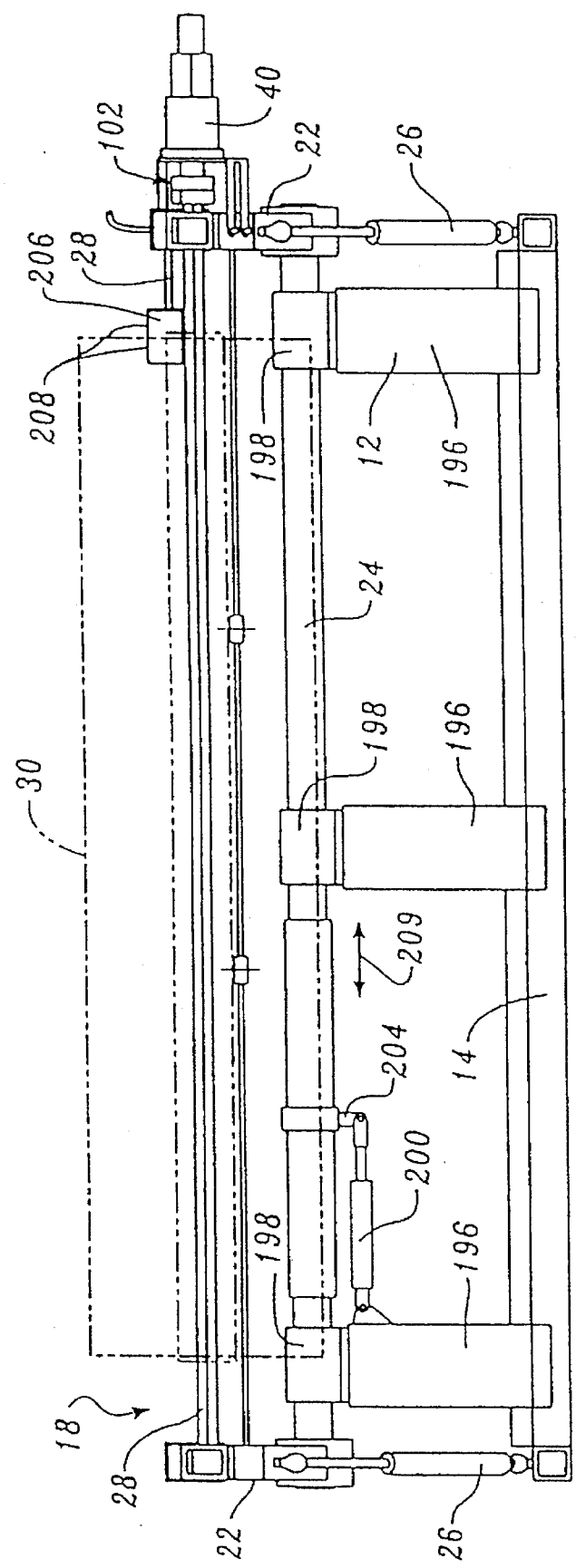
FIG. 13 is a side elevation view of the infeed end of the belt-slitting machine, showing a lateral shift cylinder for shifting the carriage assembly that supports the supply roll of belt material, and showing an edge sensing mechanism, which cooperates with the lateral shift cylinder to ensure that the belt material is properly positioned laterally about the machine.

FIG. 13 is an end view of the supply roll carriage 18. Shown in FIG. 13 are three uprights 196 that comprise part of frame 12, which is supported on base 14. Sleeve bearings 198 are provided atop uprights 196 for rotatably supporting shaft 24. Lift arms 22 support spindle 28, which carry supply roll 30, as shown in phantom lines. Motor/gearbox and coupler assembly 102 are mounted to the distal end of one of lift arms 22. Lift cylinders 26 extend from base 14 to the outer ends of lift arms 22. At both ends of lift cylinders 26 are swivel joints to allow for lateral movement of carriage 18. A lateral shift cylinder 200 is provided at one end of frame 12. Cylinder 200 is pivotally mounted at one end to upright 196, and is pivotally mounted at its other end to bracket 204, which is secured to shaft 24.

An edge sensor 206 is mounted at one edge of the belt-slitting machine 10. Edge sensor 206 comprises a pair of conventional photodetectors 208 spaced laterally from each other. Photodetectors 208 detect the presence of an edge of the belt material, and lateral shift cylinder 200 repositions shaft 24 laterally, in the direction of arrow 209, in response to edge sensor 206 in order to keep the infeed belt material aligned in relationship with the cutter disks 68.

Figure 14:
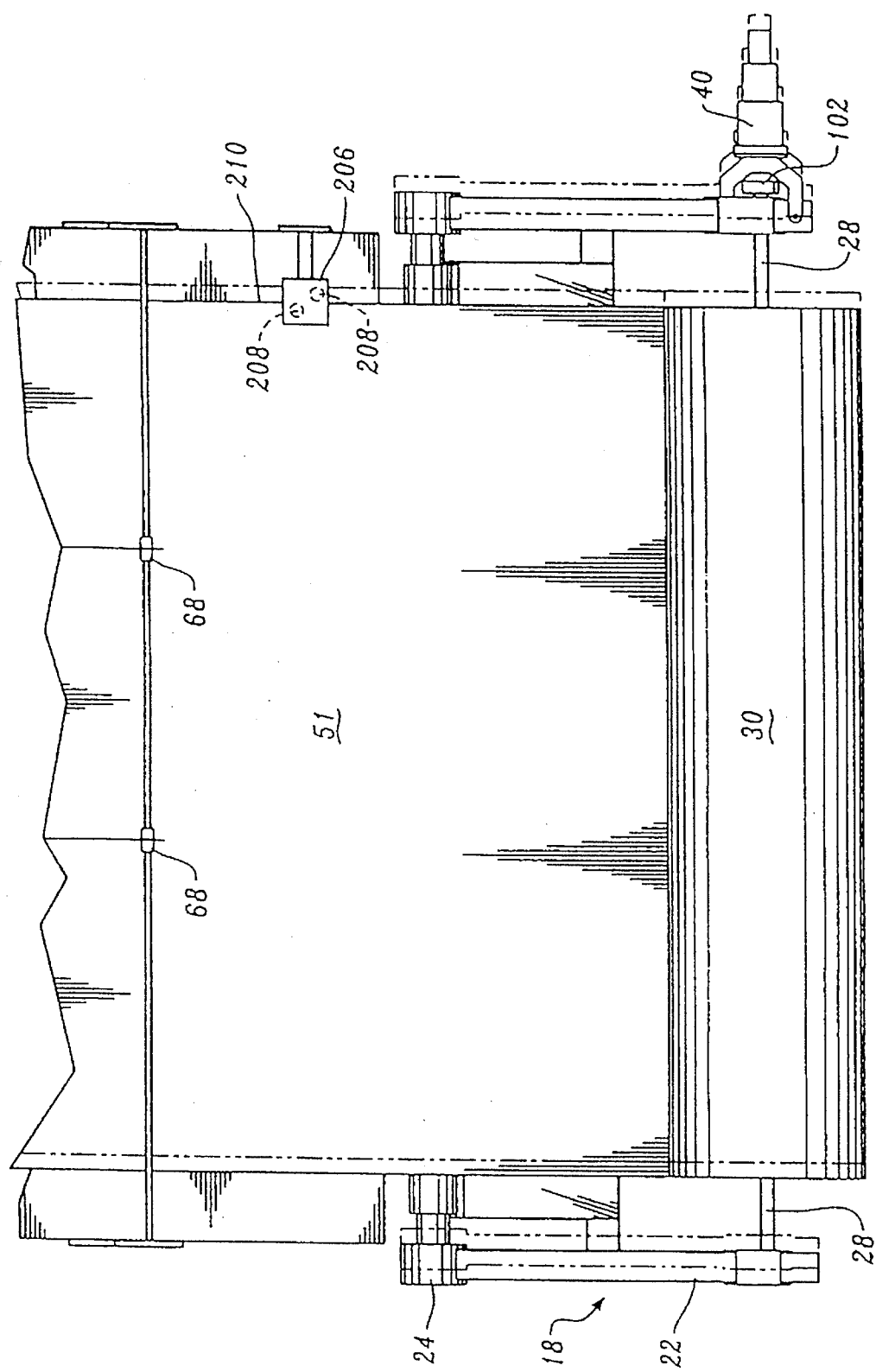
FIG. 14 is a partial overhead view of the infeed end of the machine illustrating the edge sensing mechanism of FIG. 13.

As shown in FIG. 14, photodetectors 208 are positioned about an edge 210 of belt material 51, with one photodetector positioned beyond the outer edge 210 of belt material 51, and with the other photodetector 208 positioned above the edge 210. Should the supply roll 30 shift laterally as the belt material is fed from the supply roll past the cutter disks 68, photodetectors 208 will sense the movement of edge 210 past one of the photodetectors. This lateral shifting of edge 210 will generate a signal to the control panel, which in turn will cause the lateral shift cylinder to reposition carriage 18, and cause side edge 210 to move back between photodetectors 208.

Accordingly it can be seen that an improved belt-slitting machine is provided that can allow for bending of support spindles due to heavy rolls of belt material, which can keep the supply rolls laterally positioned in order to ensure an accurate cut made in the belt material, and which can keep the slit webs of belt material aligned as they loop into takeup rolls.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A belt-slitting machine, including:

a work table;

first and second roll support means at opposite ends of the cutter path, each roll support means including a pair of movable lift arms for supporting a respective first and second spindle, the first roll support means for carrying a supply roll of belt material, the second roll support means for carrying the slit rolls of belt material;

drive means for moving a belt along a cutting path across the work table, the drive means including means for rotating the second spindle to wind the slit belt on a roll and means for rotating the first spindle to unwind the belt from the supply roll, each of said rotating means adapted to engage its corresponding spindle;

cutter means arranged in the cutting path for slitting the belt as it is moved across the work table;

the first and second spindles being substantially rectangular in cross section and being supported adjacent to and inwardly of opposite ends thereof by the lift arms;

wherein the improvement comprises:

means for coupling the rotating means to an end of each of the spindles including a first part engaged by the rotating means and a second part engaged by the spindle, the first and second parts adapted to rotate about a drive axis and including means for slidably interconnecting one another for relative linear movement along a first axis transverse to the spindle, and the second part including means for providing sliding relative movement between the second part and the spindle along a second axis that is substantially perpendicular to the first axis;

means for providing angular displacement relative to the drive axis between the first and second parts of the coupling means;

automatic edge position control means having means for detecting the position of an edge of the belt relative to the cutter means and responsive means for laterally shifting the first spindle to re-position the supply roll supported thereon for proper alignment with the cutter means; and outfeed belt divider means for maintaining alignment of cut edges of the belt as it is wound into a roll supported by the second spindle;

wherein each rotating means includes a motor, and further comprising means for disengaging each motor from its corresponding spindle; and wherein the disengaging means is mounted to the lift arms and is adapted to move the motors away from the spindles, whereby the spindles can be removed from and mounted onto the lift arms.

2. The belt-slitting machine of claim 1, wherein the means for slidably interconnecting the first and second parts includes a tab-and-groove arrangement, wherein one of the first and second parts includes a tab and the other of the first and second parts includes a groove for receiving the tab.

3. The belt-slitting machine of claim 2, wherein the means for providing the sliding relative movement between the second part and the spindle includes a channel in the second part for receiving an end of the spindle, the end of the spindle having opposed flat surfaces spaced from each other a distance slightly less than the width of the channel so that a close fit is achieved between the end of the spindle and the second part, whereby torque from the second part is positively transferred to the spindle.

4. The belt-slitting machine of claim 3, wherein the tab-and-groove arrangement between the first and second parts is oriented ninety degrees rotated from the channel that receives an end of the spindle, whereby vertical deflection of the end of the spindle, when the channel is displaced angularly from a vertical position, causes the second part to rise relative to the first part, with the tab of the tab-and-groove arrangement sliding within the corresponding groove.

5. The belt-slitting machine of claim 2, wherein the first and second parts include outer faces, adjacent the tab or groove, which outer faces are adapted to engage one another, and wherein the means for providing angular displacement includes the outer face of the first or second part having the groove being convex, and the inner surface of the groove being convex, with the convex surfaces of the outer face and inner surface having a peak lying along a line aligned with the second axis.

6. The belt-slitting machine of claim 5, wherein the means for providing angular displacement includes the outer face of the tab being convex along its length, and the outer surface of the first or second part from which the tab extends being angled from the tab to the perimeter edge of the part.

7. The belt-slitting machine of claim 5, wherein the means for providing angular displacement includes the outer face being bevelled along its length, and the outer surface of the first or second part from which the tab extends being angled from the tab to the perimeter edge of the part.

8. The belt-slitting machine of claim 2, wherein the first part includes the groove and the second part includes the tab.

9. The belt-slitting machine of claim 2, wherein the tab-and-groove arrangement includes an elongated slot aligned with the tab for receiving a headed fastener, the elongated slot including a shoulder portion in its inner region for engaging the headed fastener, the fastener being secured to the second part and extending within the elongated slot, whereby the first and second parts are coupled together, yet can move relative to each other along the first axis.

10. The belt-slitting machine of claim 1, wherein the outfeed belt divider means includes disks mounted on a shaft movably supported above and in alignment with the second roll support means, the disks spaced in alignment with the slits made in the belt material, and the shaft adapted to rest on the webs of belt material, as the webs wind into a roll supported by the second roll support means, with the disks positioned between the winding rolls of belt material.

11. The belt-slitting machine of claim 10, wherein the shaft is pivotally secured to the machine.

12. The belt-slitting machine of claim 11, wherein the shaft is supported in position above the second roll support means by piston/cylinder actuators.

* * * * *